(12) United States Patent
Stern (10) Patent No.: US 7,668,893 B2
(45) Date of Patent: Feb. 23, 2010

(54) DATA GENERATOR HAVING LINEAR FEEDBACK SHIFT REGISTERS FOR GENERATING DATA PATTERN IN FORWARD AND REVERSE ORDERS

(75) Inventor: Bryan A. Stern, Chisago City, MN (US)

(73) Assignee: Micron Technology, Inc., Boise, ID (US)

( * ) Notice: Subject to any disclaimer, the term of this patent is extended or adjusted under 35 U.S.C. 154(b) by 874 days.

(21) Appl. No.: 11/215,890

(22) Filed: Aug. 30, 2005

(65) Prior Publication Data

US 2007/0047622 A1    Mar. 1, 2007

(51) Int. Cl.
G06F 7/58 (2006.01)
(52) U.S. Cl. ...................................... 708/252
(58) Field of Classification Search ........................ None
See application file for complete search history.

(56) References Cited

U.S. PATENT DOCUMENTS

| | | | |
|---|---|---|---|
| 4,611,333 A | 9/1986 | McCallister et al. | |
| 4,667,327 A | 5/1987 | Bright et al. | |
| 4,713,605 A | 12/1987 | Iyer et al. | |
| 4,734,921 A | 3/1988 | Giangano et al. | |
| 4,825,397 A | 4/1989 | Muller | |
| 4,975,640 A | 12/1990 | Lipp | |
| 5,060,265 A | 10/1991 | Finkelstein | |
| 5,073,909 A | 12/1991 | Kotzin et al. | |
| 5,090,035 A | 2/1992 | Murase | |
| 5,105,376 A * | 4/1992 | Pedron | 708/252 |
| 5,208,705 A | 5/1993 | Avramopoulos et al. | |
| 5,383,143 A | 1/1995 | Crouch et al. | |
| 5,412,665 A | 5/1995 | Gruodis et al. | |
| 5,608,897 A | 3/1997 | Claffey-Cohen et al. | |
| 5,790,626 A * | 8/1998 | Johnson et al. | 377/69 |
| 5,867,409 A | 2/1999 | Nozuyama | |
| 5,938,784 A | 8/1999 | Kim | |
| 6,181,164 B1 | 1/2001 | Miller | |
| 6,424,691 B1 | 7/2002 | Neravetla et al. | |
| 6,463,448 B1 | 10/2002 | Mo | |
| 6,556,647 B1 | 4/2003 | Neravetla | |
| 6,631,158 B2 | 10/2003 | Lipponen et al. | |
| 6,654,439 B1 | 11/2003 | Kommrusch | |
| 6,665,692 B1 | 12/2003 | Nieminen | |
| 6,763,363 B1 | 7/2004 | Driscoll | |
| 6,769,084 B2 | 7/2004 | Kim et al. | |
| 6,772,301 B2 | 8/2004 | Cheng et al. | |
| 6,922,089 B2 | 7/2005 | Shiung | |
| 2002/0129071 A1* | 9/2002 | Howlett | 708/252 |
| 2008/0281892 A1* | 11/2008 | Hemming | 708/252 |

* cited by examiner

Primary Examiner—David H Malzahn
(74) Attorney, Agent, or Firm—Schwegman, Lundberg & Woessner, P.C.

(57) ABSTRACT

Some embodiments of the invention includes a data generator. The data generator includes a data generating circuit having a combination of linear feedback shift registers and shift registers for generating a pseudo-random data pattern in a first order. The data generator also includes a recovery circuit for allowing the data generating circuit to generate the pseudo-random data pattern in a second order. The second order is a reverse of the first order. Other embodiments are described and claimed.

32 Claims, 5 Drawing Sheets

FIG. 1

| $D_Z$ | | | | | $D_0$ | COM | TIME |
|---|---|---|---|---|---|---|---|
| D[5] | D[4] | D[3] | D[2] | D[1] | D[0] | | |
| 1 | 1 | 1 | 1 | 1 | 0 | C0 | T0 |
| 1 | 1 | 1 | 1 | 1 | 1 | C1 | T1 |
| 1 | 1 | 1 | 0 | 1 | 1 | C2 | T2 |
| 1 | 1 | 0 | 1 | 0 | 1 | C3 | T3 |
| 1 | 0 | 1 | 0 | 1 | 0 | C4 | T4 |
| 0 | 1 | 0 | 0 | 0 | 0 | C5 | T5 |
| 1 | 0 | 0 | 1 | 0 | 0 | C6 | T6 |
| 0 | 1 | 0 | 0 | 0 | 0 | C5 | T7 |
| 1 | 0 | 1 | 0 | 1 | 0 | C4 | T8 |
| 1 | 1 | 0 | 1 | 0 | 1 | C3 | T9 |
| 1 | 1 | 1 | 0 | 1 | 1 | C2 | T10 |
| 1 | 1 | 1 | 1 | 1 | 1 | C1 | T11 |
| 1 | 1 | 1 | 1 | 1 | 0 | C0 | T12 |

(rows 1-7 grouped as 201; rows 8-13 grouped as 202)

DATA GENERATOR HAVING LINEAR FEEDBACK SHIFT REGISTERS FOR GENERATING DATA PATTERN IN FORWARD AND REVERSE ORDERS

FIELD

The present application relates generally to generating random data and more particularly to generating pseudo-random data using linear feedback shift registers (LFSR).

BACKGROUND

An LFSR is occasionally used in data generators to generate a pseudo-random pattern for purposes such as testing of electrical devices. A typical LFSR often includes a combination of one shift register circuit combined with some logic circuits. Most data generators with a typical LFSR generate the pseudo-random data pattern data in only one order.

In some situations, generating a pseudo-random data pattern in only one order may limit the use of the pseudo-random data pattern.

SUMMARY OF THE INVENTION

The embodiments of the present invention provide circuits and methods for generating a pseudo-random data pattern in both forward and reverse orders.

One aspect includes a data generator having a data generating circuit and a recovery circuit. The data generating circuit generates a plurality of first data sequences in a first order during a first duration. The recovery circuit allows the data generating circuit to generate a plurality of second data sequences in a second order during a second duration. The second order is a reverse of the first order.

Another aspect includes a method in which the method includes generating a pseudo-random data pattern having a number of first data sequences. The method also includes generating a second pseudo-random data pattern having a number of second data sequences. The first data sequences are generated in a forward order. The second data sequences are generated in a reverse order, which is a reverse of the forward order.

A further aspect includes a system and method for generating a data pattern in both forward and reverse order for testing a device such as a memory device.

Other aspects of the embodiments of the present invention will be apparent upon reading the present application including the drawings and claims.

DETAILED DESCRIPTION OF THE EMBODIMENTS

The following description and the drawings illustrate specific embodiments of the invention sufficiently to enable those skilled in the art to practice the invention. Other embodiments may incorporate structural, logical, electrical, process, and other changes. In the drawings, like numerals describe substantially similar components throughout the several views. Examples merely typify possible variations. Portions and features of some embodiments may be included in or substituted for those of others. The scope of the invention encompasses the claims and all available equivalents.

Figure 1:
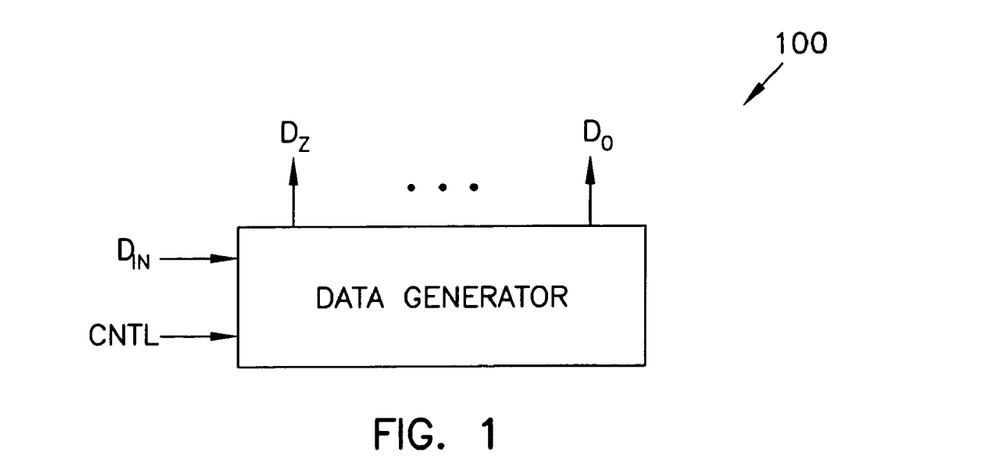
FIG. 1 shows a data generator according to an embodiment of the invention.

FIG. 1 shows a data generator according to an embodiment of the invention. Data generator 100 receives input signals $D_{IN}$ and CNTL and generates output signals $D_0$ to $D_Z$, where Z an integer. The $D_0$ to $D_Z$ signals present a number of data bits. The number of data bits $D_0$ to $D_Z$ depends on the value of Z. For example, when Z is three, the number of data bits $D_0$ to $D_Z$ is four; when Z is 31, the number of data bits $D_0$ to D is 32. In this specification, the terms signal, data, bit, and data bits are used interchangeably. Thus, $D_{IN}$ and CNTL may be referred to as input data or input bits. In some embodiments, each of the $D_{IN}$ and CNTL may include multiple bits. $D_{IN}$ may include initial input bits based on which $D_0$ to $D_Z$ are generated. CNTL may include control data to allow data generator 100 to control the generation of $D_0$ to $D_Z$. $D_0$ to $D_Z$ may be provided in parallel.

The combination of $D_0$ to $D_Z$ forms a data sequence. Data generator 100 generates a plurality of different data sequences at different times. Each of the data sequences includes a combination of binary values of zeros and ones. In some embodiments, the CNTL signal may include a clock signal. Data generator 100 may generate each data sequence $D_0$ to $D_Z$ based on the timing of the clock signal. For example, data generator 100 may generate a plurality of data sequences based on timing of a plurality of cycles (periods) of a clock signal, in which each of the data sequences may be generated during one cycle of the clock signal.

Figure 2:
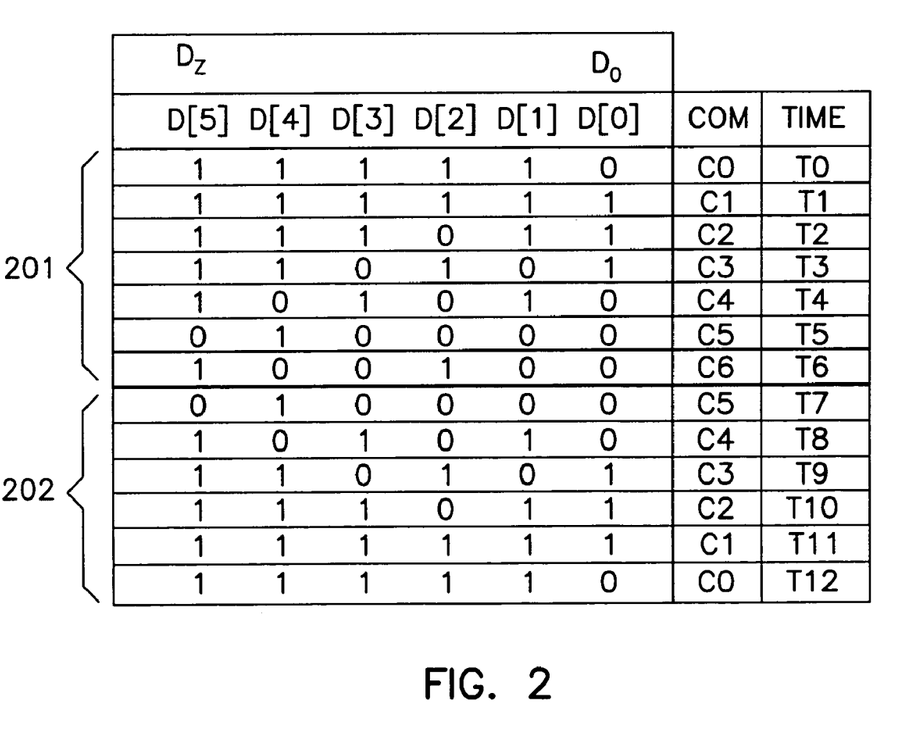
FIG. 2 shows example data patterns generated by the data generator of FIG. 1.

FIG. 2 shows example data patterns generated by the data generator of FIG. 1. In FIG. 2, D[0], D[1], D[2], D[3], D[4], and D[5] are output data bits generated by data generator 100 of FIG. 1. FIG. 2 shows six data bits D[0] to D[5] as an example. The number of data bits may be different from six. T0 to T12 in FIG. 2 represent different times. T0 to T12 occur sequentially in which T0 occurs before T1, T1 occurs before T2, and T12 occurs after all other times.

At each of the times T0 to T12, the combination of D[0] to D[5] forms a single data sequence having a combination of binary zeros and ones. For example, at time T3, D[0] to D[5] form a data sequence having a combination 110101; at time T8, D[0] to D[5] form a data sequence having a combination 101010. In FIG. 2, C0 to C6 represent six different combinations of D[0] to D[5]. For example, D[0] to D[5] at time T3 has a combination C3; D[0] to D[5] at time T4 has a combination C4. D[0] to D[5] at time T8 also has a combination C4 because D[0] to D[5] at time T8 (101010) is identical to D[0] to D[5] at time T4 (101010).

FIG. 2 shows two data patterns 201 and 202. Data pattern 201 includes the data sequences generated from time T0 to time T6. Data pattern 202 includes the data sequences generated from time T7 to time T12. The data sequences in each of the data patterns 201 and 202 form a pseudo-random data pattern.

As shown in FIG. 2, the order in which the data sequences of data pattern 201 are generated follows the order of the combinations C0, C1, C2, C3, C4, C5 and C6 (forward order).

The order in which the data sequences of data pattern 202 are generated follows the order of the combinations C5, C4, C3, C2, C1, and C0 (reverse order). Thus, after time T6, data generator 100 generates the data sequences that are identical to the data sequences previously generated from time T0 to time T5 but in a reverse order.

The time interval from one time to another time may be referred to as a duration. For example, the time interval from time T0 to time T6 may be referred to as a first duration; the time interval from time T7 to time T12 may be referred to as a second duration. Thus, data generator 100 generates the data sequences (C5, C4, C3, C2, C1, and C0) in the second duration in an order reserved from the order that the data sequences (C0, C1, C2, C3, C4, and C5) are generated during the first duration. In some embodiments, data pattern 202 in FIG. 2 may include C6, C5, C4, C3, C2, C1, and C0 such that both data patterns 201 and 202 have the data sequences of C0, C1, C2, C3, C4, C5, and C6 (forward order), C6, C5, C4, C3, C2, C1, and C0 (reverse order).

In the example data pattern represented by FIG. 2, data generator 100 of FIG. 1 begins to generate the data sequence in a reverse order at time T7, which is after seven data sequences are generated (C0 to C6). In some embodiments, data generator 100 of FIG. 1 may begin to generate the data sequences in the reverse order at a time different from time T7 and after a selected number of data sequences different from seven are generated. For example, data generator 100 of FIG. 1 may begin to generate the data sequences in a reverse order after a selected number of five data sequences are generated such that the total data sequences may have the combinations C0, C1, C2, C3, C4, C3, C2, C1, and C0. In some embodiments, the selected number may be a variable, which may be provided to data generator 100 in the form of control data represented by CNTL in FIG. 1.

In some embodiments, data generator 100 of FIG. 1 may begin to generate the data sequences in the reverse order after at least two (two or more) patterns of identical data sequences are generated in the forward order. For example, data generator 100 of FIG. 1 may generate the data sequence having a combination C0, C1, C2, C3, C4, C5, C6, C0, C1, C2, C3, C4, C5, C6, C6, C5, C4, C3, C2, C1, C0, C6, C5, C4, C3, C2, C1, C0. In this example, pattern C0 to C6 are generated twice before data generator 100 begins to generate the data sequences in the reverse order. In some cases in this example, the third occurrence of C6 (bolded C6 in the data sequence) may be omitted.

In some other embodiments, data generator 100 of FIG. 1 may begin to generate the data sequences in the reverse order after at least one (one or more) forward pattern of data sequences and a portion of the forward pattern of data sequences are generated in the forward order. For example, data generator 100 of FIG. 1 may generate the data sequence having a combination C0, C1, C2, C3, C4, C5, C6, C0, C1, C2, C3, C4, C4, C3, C2, C1, C0, C6, C5, C4, C3, C2, C1, C0. In this example, pattern C0 to C6 are generated once and a portion of C0 to C6 (which is portion C0 to C4) are generated before data generator 100 begins to generate the data sequences in the reverse order. In some cases in this example, the third occurrence of C4 (bolded C4 in the data sequence) may be omitted.

FIG. 2 shows two pseudo-random data patterns 201 and 202 including 13 data sequences from T0 to T12, as an example. In some embodiments, numerous data sequences different from 13 may be generated.

In some embodiments, data generator 100 includes embodiments of a data generator described below in FIG. 3 through FIG. 6.

Figure 3:
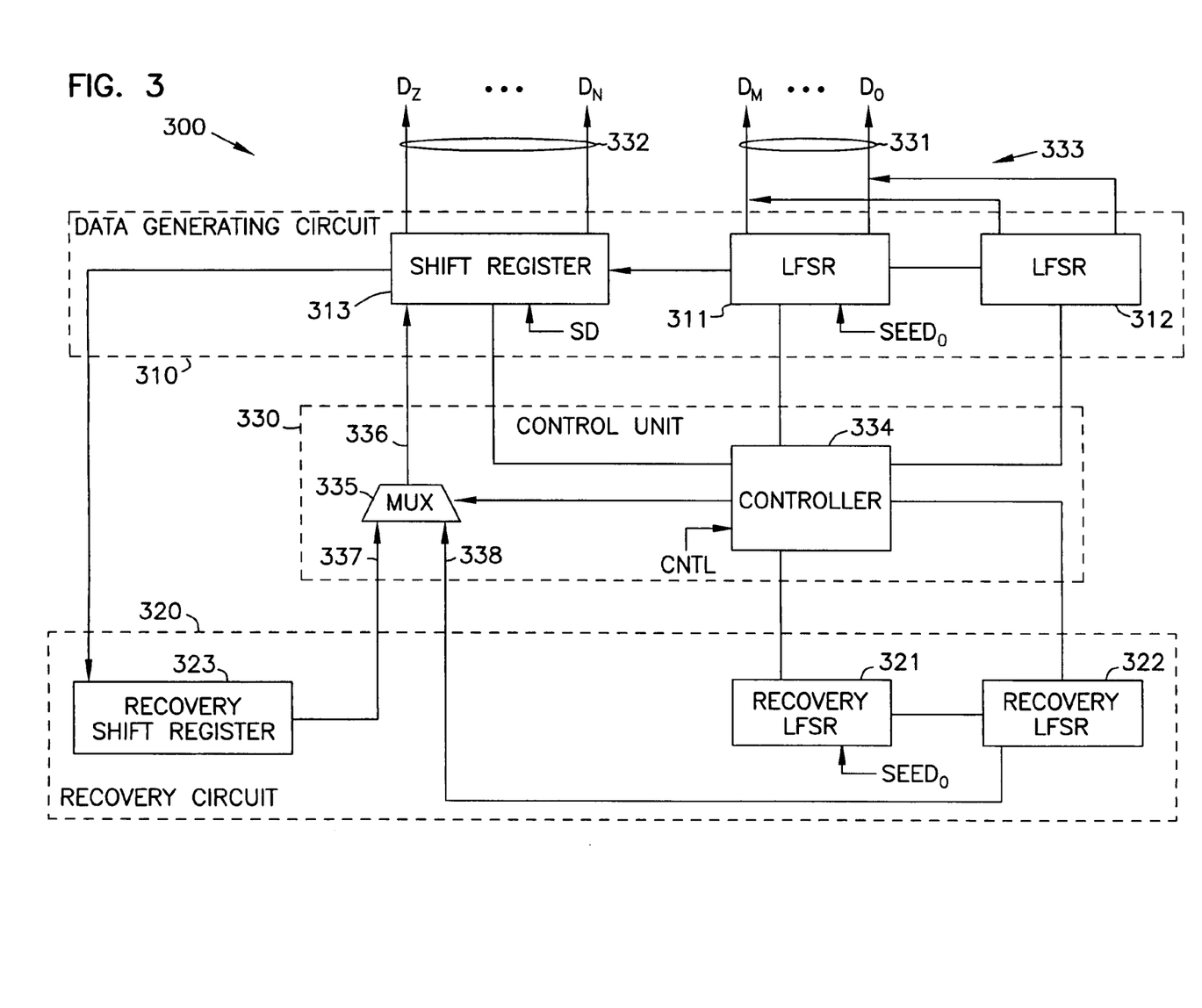
FIG. 3 shows a data generator with LFSRs according to an embodiment of the invention.

FIG. 3 shows a data generator with LFSRs according to an embodiment of the invention. Data generator 300 includes a data generating circuit 310 to generate output data at output nodes 333, a recovery circuit 320 to allow generating circuit 310 to generate the output data in a reverse order, and a control unit 330 to control the operation of data generator 300.

Output nodes 333 include a first subset of output nodes 331 for providing a first group of data bits $D_0$ to $D_M$, and a second subset of output nodes 332 for providing a second group of data bits $D_N$ to $D_Z$. N, M, and Z are integers. For example, when Z=23, the combination of $D_0$ to $D_Z$ represents a 24-bit binary number (D[0] to D[23]) in which $D_N$ and $D_M$ are the two bits between 0 and 23. Bits $D_N$ and $D_M$ are consecutive bits. For example, when Z=23, $D_N$ may be bit 11 and $D_M$ may be bit 12.

In FIG. 3, $D_0$ may represent the least significant bit (LSB) which is the bit at position zero, $D_Z$ may represent the most significant bit (MSB), $D_N$ and $D_M$ are consecutive bits within the combination. In some embodiments, $D_Z$ may represent the least significant bit (LSB), $D_0$ may represent the most significant bit (MSB). Data generating circuit 310 may be constructed such that the number of bits from $D_0$ to $D_M$ may be different from the number of bits from $D_N$ to $D_Z$.

The combination of $D_0$ to $D_M$ and the combination of $D_N$ to $D_Z$ form a data sequence in which $D_0$ to $D_M$ represent one portion of the data sequence and $D_N$ to $D_Z$ represent another portion of the data sequence. For example, when a data sequence from $D_0$ to $D_Z$ is a 24-bit data sequence (Z=23), $D_0$ to $D_M$ may form a first 12-bit portion such as bit 0 to bit 11, and $D_N$ to $D_Z$ may form a second 12-bit portion such as bit 12 to bit 23.

Data generating circuit 310 includes an LFSR 311 and an LFSR 312 for generating bits $D_0$ to $D_M$, and a shift register 313 for generating bits $D_N$ to $D_Z$. LFSRs are readily known to a person skilled in the art. A typical LFSR is often used to generate a pattern of pseudo-random data based on an initial (or seed) data. Each of the LFSR 311 and LFSR 312 may include a number of register cells connected in series. The register cells may be latches, flip flops, or other memory elements. Each of the LFSR 311 and LFSR 312 may also include one or more logic gates, which combine with the register cells to generate a pseudo-random data pattern based on an initial seed data.

LFSR 311 and LFSR 312 in FIG. 3 are constructed to perform functions that are reversed from each other. For example, LFSR 311 may be constructed to generate a second data sequence based on the first data sequence, whereas LFSR 312 may be constructed to regenerate the first data sequence based on the second data sequence received from LFSR 311.

LFSR 311 and LFSR 312 are used at different durations in the operation of data generator 300 such that only one of the LFSR 311 and LFSR 312 generates $D_0$ to $D_M$ in a given duration. For example, LFSR 311 may be used during a first duration to generate $D_0$ to $D_M$; LFSR 312 may be used during a second duration (after the first duration) to generate $D_0$ to $D_M$. A duration refers to a time interval such as the time interval from T0 to T6 or the time interval from T7 to T12 of FIG. 2.

Shift register 313 is used in combination either with LFSR 311 at one duration or with LFSR 312 at another duration. In some embodiments, shift register 313 is a bi-directional shift register such that the content in shift register 313 may be shifted in one direction (for example, left) at one time and in another direction (for example, right) at another time. The combination of $D_0$ to $D_M$ generated by LFSR 311 or LFSR 312 combined with the combination of $D_N$ to $D_Z$ generated by shift register 313 forms a data sequence $D_0$ to $D_Z$.

Recovery circuit 320 includes a recovery LFSR 321 and a recovery LFSR 322, and a recovery shift register 323. Recovery LFSR 321 and LFSR 311 are constructed to perform an identical function. Thus, the circuit structure of recovery LFSR 321 may be a copy of the circuit structure of LFSR 311. Recovery LFSR 322 and LFSR 312 are constructed to perform an identical function. Thus, the circuit structure of recovery LFSR 322 may be a copy of the circuit structure of LFSR 312.

Recovery LFSR 322 performs a function that is a reverse of the function of recovery LFSR 321. Recovery LFSR 321 generates a plurality of recovery data bits to retain a copy of a content of LFSR 311 during the first duration. Recovery LFSR 322 uses the recovery data bits from recovery LFSR 321 to allow data generating circuit 310 to regenerate a data bit of the portion $D_N$ to $D_Z$ of each of the data sequences of $D_0$ to $D_Z$ in the second duration.

Recovery shift register 323 stores a copy of the data bits that are shifted out of shift register 313 during the generation of $D_0$ to $D_Z$. In some embodiments, recovery shift register 323 is a bi-directional shift register such that the data bits from shift register 313 may be shifted to recovery shift register 323 in one direction at one time. At another time, the data bits from recovery shift register 323 may be shifted back to shift register 313 in another direction. For example, the first data bit shifted to recovery shift register 323 from shift register 313 may be the last data bit shifted back to shift register 313 from recovery shift register 323 during the regeneration of the $D_N$ to $D_Z$ portion.

Control unit 330 includes a controller 334 and a multiplexer (MUX) 335. Controller 334 controls the interaction between data generating circuit 310 and recovery circuit 320. MUX 335 includes an output 336, and inputs 337 and 338. MUX 335 allows recovery circuit 320 to select data from either recovery shift register 323 or recovery LFSR 322 at input 337 or 338. MUX 335 provides the selected data to shift register 313 via output 336. The operation of data generator 300 is described in connection with FIG. 4.

Figure 4:
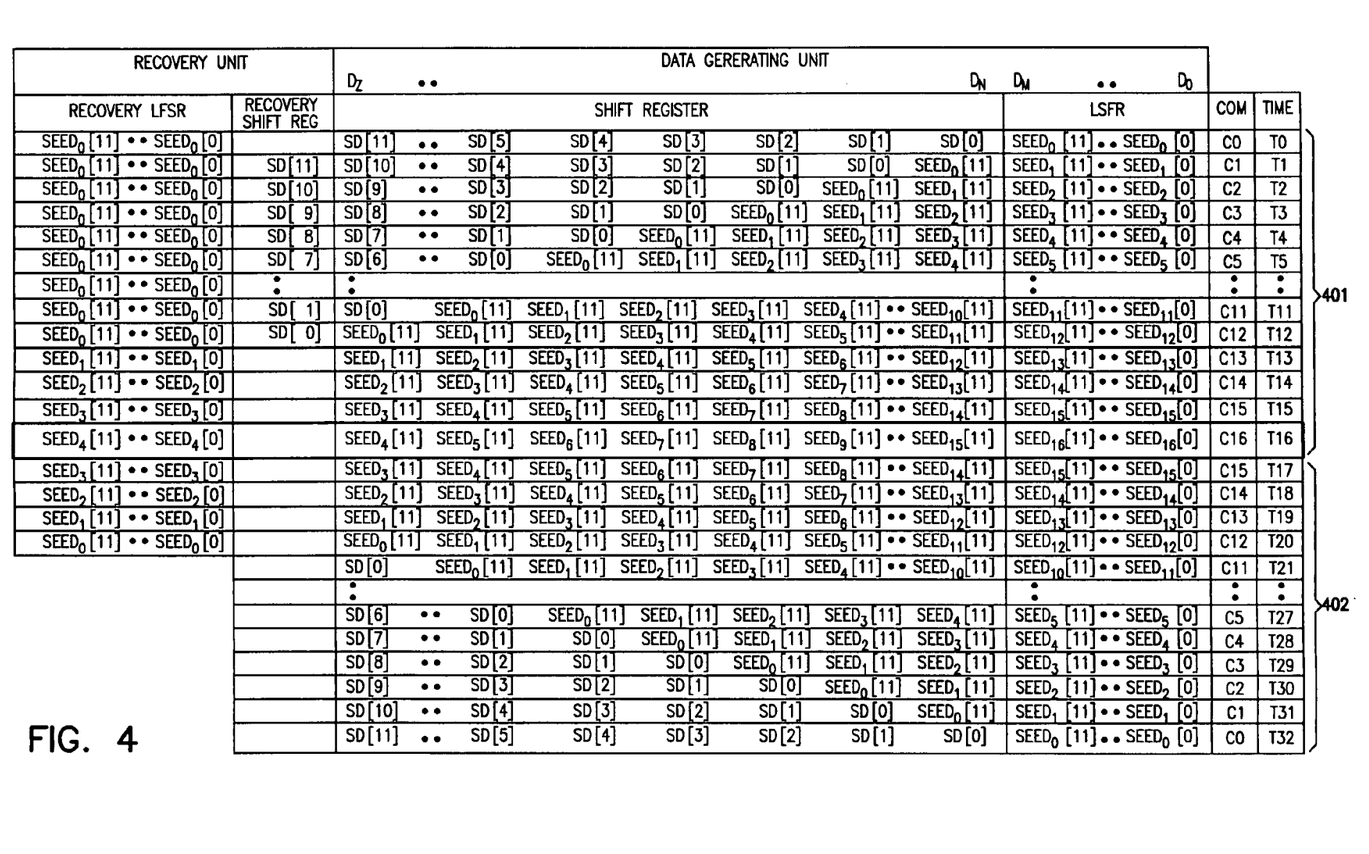
FIG. 4 shows example data patterns generated by the data generator of FIG. 3.

FIG. 4 shows example data patterns generated by the data generator of FIG. 3. In FIG. 4, T0 to T32 represent different times in which time T0 to time T16 correspond to a first duration and time T17 to T32 correspond to a second duration. In some embodiments, each of the times T0 to T32 may occur based on an edge of a clock signal such that the time interval between two consecutive times is equal to the cycle (period) of a clock signal. For example, the time interval from T0 to T1 may be equal to a cycle of the clock signal. For clarity, FIG. 3 omits the clock signal.

In FIG. 4, each data sequence is a combination of $D_0$ to $D_Z$ generated at each of the times T0 to T32. Since FIG. 4 shows 33 times (T0 to T32), a total of 33 data sequences are generated in FIG. 4. For clarity, FIG. 4 omits some of the data sequences. For example, FIG. 4 omits data sequences between times T5 and T11 and between times T21 and T27. Each data sequence includes a combination of data bits. The combinations C0 to C16 in FIG. 4 represent different combinations of the data sequences generated by data generating circuit 310 of FIG. 3.

FIG. 4 shows two data patterns 401 and 402. Data pattern 401 includes the data sequences generated from time T0 to time T16. Data pattern 402 includes the data sequences generated from time T17 to T32. The data sequences in each of the data patterns 401 and 402 form a pseudo-random data pattern. As shown in FIG. 4, data pattern 401 includes the data sequences generated in a forward order (C0 to C16), data pattern 402 includes the same data sequences (C0 to C15) but generated in an order reversed from the order of data pattern 401.

The data in the LFSR box in FIG. 4 represents the data generated by LFSR 311 of FIG. 3 from time T0 to time T16 and by LFSR 312 from time T17 to time T32. The data in the shift register box in FIG. 4 represents the data generated by shift register 313 of FIG. 3. In FIG. 4, the data in the recovery shift register (REG) box represents the content of recovery shift register 323 of FIG. 3. The data in the recovery LFSR box of FIG. 4 represents the data generated by recovery LFSR 321 and LFSR 322 of FIG. 3.

FIG. 4 shows each of the data sequences having 24 bits as an example. Also as an example, a first portion ($D_0$ to $D_M$) of each data sequence has 12 bits and a second portion ($D_N$ to $D_Z$) of each data sequence also has 12 bits. $D_0$ to $D_M$ are represented by a 12-bit combination of seed data $SEED_X[0]$ to $SEED_X[11]$, where X is an integer representing the number of the combinations of seed data generated in the first duration. In the example of FIG. 4, X is 17 representing 17 combinations of seed data (combination $SEE0_X[0]$ to $SEED0[11]$ through combination $SEE0_{16}[0]$ to $SEED_{16}[11]$). In some embodiments, X may be a number different from 17. $D_N$ to $D_Z$ are represented by a 12-bit combination of $SD[0]$ to $SD[11]$ at time T0. From time T1 to time T11, $D_N$ to $D_Z$ are represented by a 12-bit combination of a mix of some of the bits $SD[0]$ to $SD[11]$ and some of the bits $SEED_X[11]$. From time T12 to time T20, $D_N$ to $D_Z$ are represented and by a 12-bit combination of $SEED_X$.

As shown in FIG. 4, data generator 300 of FIG. 3 generates the data sequences (C0 to C16) from time T0 to time T16. From time T17 to time T32, data generator 300 generates the same data sequences (C0, C1, ..., C15) previously generated at times T0 to time T15 but in a reverse order (C15, C14, ..., C0). The order C0, C11, ..., C15 may be referred to as the forward order. The order C15, C14, ..., C0 may be referred to as the reversed order. Thus data generator 300 generates a number of data sequences in both forward and reverse orders. The operation of data generator 300 of FIG. 3 is described in more details in the following description.

At time T0, the same initial data (initial seed data) $SEED_0$ is provided to both LFSR 311 and recovery LFSR 321 of FIG. 3. $SEED_0$ includes a combination of a number of bits. For example, $SEED_0$ includes a combination of 12 bits, which are shown in FIG. 4 as $SEED_0[0]$ to $SEED_0[11]$ at time T0. Also at time T0, an initial shift data SD is provided to shift register 313 of FIG. 3. SD includes a combination of a number of bits. For example, SD includes a combination of 12 bits, which are shown in FIG. 4 as $SD[0]$ to $SD[11]$ at time T0. For clarity, at time T0, FIG. 4 shows dots between $SD[5]$ and $SD[11]$ to represent the other shift data bits $SD[6], SD[7], S[8], SD[9],$ and $SD[10]$ provided to shift register 313 at time T0. $SEED_0[0]$ to $SEED_0[11]$ may be provided to LFSR 311 in parallel or in series. Similarly, $SD[0]$ to $SD[11]$ may be provided to shift register 313 in parallel or in series. SD and $SEED_0$ of FIG. 3 may correspond to $D_{IN}$ of FIG. 1.

In FIG. 4, the combination of $SD[0]$ to $SD[11]$ and the combination of $SEED_0[0]$ to $SEED_0[11]$ at time T0 may be different combinations of binary numbers. As an example only, $SD[0]$ to $SD[11]$ may have 12-bit combination 101010101010 in which $SD[0]$ has a binary value 0 and $SD[11]$ has a binary value 1. Also as an example, $SEED_0[0]$ to $SEED_0[11]$ may have a combination 01111000001 in which $SEED_0[0]$ has a binary value 1 and $SD[11]$ has a binary value 0.

The number of bits of $SEED_0$ provided to LFSR at time T0 is based on the number of bit length of LFSR 311. For example, when LFSR 311 is a 12-bit-long LFSR, the number of bits of $SEED_0$ may be 12 bits. The number of bits of SD provided to shift register 313 is based on the number of bit length of shift register 313. For example, when shift register 313 is a 12-bit-long shift register, the number of bits of SD may be 12 bits.

The combination of $SEED_0[0]$ to $SEED_0[11]$ and $SD[0]$ to $SD[11]$ at time T0 forms an initial data sequence having a combination C0. Data generating circuit 310 of FIG. 3 may provide $SEED_0[0]$ to $SEED_0[11]$ and $SD[0]$ to $SD[11]$ at time T0 to output nodes 333 of FIG. 3 as $D_0$ to $D_M$ and $D_N$ to $D_Z$.

At time T1, LFSR 311 generates another 12-bit combination of seed data $SEED_1[0]$ to $SEED_1[11]$ based on the previous data bits $SEED_0[0]$ to $SEED_0[11]$. $SEED_1[0]$ to $SEED_1[11]$ has a different combination (C1). Shift register 313 also generates another 12-bit combination by shifting left such that each of the bits $SD[0]$ to $SD[11]$ is shifted one position to the left. As shown in FIG. 4 at time T1, the shift left causes bit $SD[11]$ to be shifted out of shift register 313. Bit $SD[11]$ is not lost; it is shifted to and stored in recovery shift register 323. At time T1, $SD[10]$ becomes the bit representing $D_Z$; $SD[0]$ previously at bit $D_N$ is shifted to the left and is replaced by $SEED_0[11]$ from LFSR 311. Thus, at time T1, the combination of $SEED_1[0]$ to $SEED_1[11]$ (in LFSR 311), and $SEED_0[11]$, and $SD[0]$ to $SD[10]$ (in shift register 313) forms another data sequence having a combination C1.

From time T2 to time T16, the other data sequences having combinations C2 to C16 are generated in process similar to the process at time T1. At each of the times from T2 to time T16, LFSR 311 generates a new combination of seed data $SEED_X[0]$ to $SEED_X[11]$, $SEED_X[11]$ in LFSR 311 is provided to shift register 313 to replace the previous bit at $D_N$. At each of the times from T2 to time T16, shift register 313 shifts to the left to generate a new content. The bit in the left-most position ($D_Z$) of shift register 313 is shifted out and stored in recovery shift register 323. Recovery shift register 323 may need to store only the initial shift data $SD[0]$ to $SD[11]$. Since the initial SD has 12 bits in this example, recovery shift register 323 may stop receiving data bits from shift register 313 after time T12.

Recovery LFSR 321 from time T0 to time T12 retains the same initial seed data $SEED_0[0]$ to $SEED_0[11]$. Recovery LFSR 321 starts to generate a new seed data $SEED_X[0]$ to $SEED_X[11]$ after bit $SEED_0[11]$ of the initial seed data has shifted (propagated) through the entire bit length of shift register 313. The bit length is the number of bits of shift register 313. In FIG. 4, since shift register 313 is 12-bit-long, bit $SEED_0[11]$ is shifted through 12 bits of shift register 313 after 12 shifts (from time T1 to time T12). Thus, at time T13, recovery LFSR 321 starts to generate a new seed data $SEED_1[0]$ to $SEED_1[11]$. Recovery LFSR 321 may continue to generate other new seed data ($SEED_X[0]$ to $SEED_X[11]$) until a time such as time T17 when data generating circuit 310 starts to generate the data sequences in the reverse order.

The time such as time T13 (when recovery LFSR 321 starts to generate a new seed data) depends on the bit-length of shift register 313. Controller 334 of FIG. 3 may enable recovery LFSR 321 to start to generate the new seed data based on the bit-length of shift register 313. For example, when the bit-length of shift register 313 is L (an integer), controller 334 may enable recovery LFSR 321 to start to generate the new seed data after L cycles of a clock signal counting from time T0. The new seed data $SEED_X[0]$ to $SEED_X[11]$ generated by recovery LFSR 321 allows shift register 313 to regenerate the $D_N$ to $D_Z$ portion the data sequences previously generated from time T0 to time T16 but in a reverse order.

At time T17 data generating circuit 310 starts to generate the data sequences previously generated from time T0 to time T16. Time T17 may be selected by providing to data generator 300 control data such as CNTL in FIG. 3. In FIG. 4, the selected number is 17 such that after 17 data sequences (C0 to C16) are generated, data generator 300 may start to generate the data sequences in the reverse order.

From time T17 to time 32, the portion $D_0$ to $D_M$ of each of the data sequences $D_0$ to $D_Z$ is generated by LFSR 312 instead of by LFSR 311. At time T16, the content of LFSR 311 is provided or loaded to LFSR 312. In some embodiments, controller 334 may cause $SEED_{16}[0]$ to $SEED_{16}[11]$ to be loaded into LFSR 312 at time 16 based on control data (represented by CNTL in FIG. 3) provided to data generator on or before time T0. Thus, a time different from time T17 may be selected by providing a different control data CNTL to data generator 300.

LFSR 312 generates $SEED_X[0]$ to $SEED_X[11]$ from time T17 to time T32, based on the initial seed data $SEED_{16}[0]$ to $SEED_{16}[11]$ provided to LFSR 312 at time T16. Since LFSR 312 performs a function that is a reverse of the function of LFSR 311, $SEED_X[0]$ to $SEED_X[11]$ generated by LFSR 312 from time 17 to time 32 is the same as $SEED_X[0]$ to $SEED_X[11]$ generated by LFSR 311 from time T0 to time 15 but in a reverse order. From time T17 to T32, $SEED_X[0]$ to $SEED_X[11]$ represent portion $D_0$ to $D_M$ of each data sequence $D_0$ to $D_Z$. The other portion $D_N$ to $D_Z$ of each data sequence $D_0$ to $D_Z$ from time T17 to T32 is provided by shift register 313.

At time T17 shift register 313 shifts right such that each of the bits in shift register 313 (previously present in shift register 313 at time T16) is shifted one position to the right. As shown in FIG. 4 at time T17, after the shift, each of the bits $SEED_4[11]$ to $SEED_{14}[11]$ (from time T16) is shifted one position to the right. Bit $SEED_{15}[11]$ previously representing $D_N$ at time T16 is shifted out of shift register 313 at time T17 and is discarded. At time T17, bit $SEED_4[11]$, previously representing $D_Z$ at time T16, is shifted one position to the right and is replaced by bit $SEED_3[11]$. $SEED_3[11]$ is provided by recovery LFSR 322.

From time T17 to time T20, recovery LFSR 322 generates the data $SEED_X[0]$ to $SEED_X[11]$ based on the initial seed data $SEED_4[0]$ to $SEED_4[11]$ provided to recovery LFSR 322 from recovery LFSR 321 at time T16. In some embodiments, controller 334 may cause $SEED_4[0]$ to $SEED_4[11]$ to be loaded into recovery LFSR 322 at time T16 based on control data (represented by CNTL in FIG. 3) provided to data generator on or before time T0. Since recovery LFSR 322 performs a function that is a reverse of the function of recovery LFSR 321, the data $SEED_X[0]$ to $SEED_X[11]$ generated by LFSR 312 from time T17 to time T20 is the same as the data $SEED_X[0]$ to $SEED_X[11]$ generated by recovery LFSR 311 from time T12 to time T15 but in a reverse order. From time T17 to T20, bit $SEED_X[11]$ generated by recovery LFSR 322 is provided to shift register 313 to represent $D_Z$.

From times T21 to time T32, the bit representing $D_Z$ is provided by recovery shift register 323 instead of by recovery LFSR 322. From time T17 to time T20, controller 334 causes MUX 335 to select data from recovery LFSR 322 and provide the selected data ($SEED_X[11]$) to shift register 313. From time T21 to time T32, controller 334 causes MUX 335 to select data from recovery shift register 323 provide the selected data ($SD[0]$ to $SD[11]$) to shift register 313.

In some embodiments, recovery shift register 323 is a bi-directional shift register. For example, from time T1 to time T12 bits $SD[0]$ to bit $SD[11]$ may be sequentially stored in recovery shift register 323 in an order starting from bit $SD[11]$ down to bit $SD[0]$. From time T21 to time T32, bits SD[0] to bit SD[11] from recovery shift register 323 may be sequentially provided to shift register 313 in an order starting from bit SD[0] at time T21 to bit SD[11] at time T32.

In some embodiments, the time at which controller 334 causes MUX 335 to select from recovery shift register 323 may be based on the following conditions.

If a selected number of the data sequences to be generated in the first duration is S, and if S is less than the number of the bit-length of shift register 313, then controller 334 may cause MUX 335 to select data from recovery shift register 323 after S number of data sequences are generated in the first duration.

If a selected number of the data sequences to be generated in the first duration is S, and if S is greater than the number of the bit-length of shift register 313, then the controller 334 may cause MUX 335 to select data from recovery LFSR 322 after S number of data sequences are generated in the first duration. MUX 335 selects data from recovery LFSR 322 until T number of data sequences are generated, where T=S+(S−L), and where L is the bit-length of shift register 313. After T number of data sequences are generated, controller 334 may cause MUX 335 to select data from shift register 323.

In the above description, data generating circuit 310 begins to generate the data sequences in a reverse order starting from time T17 as an example. In some embodiments, data generating circuit 310 may begin to generate the data sequences in a reverse order at a different time. For example, data generator 300 of FIG. 3 may begin to generate the data sequences in a reverse order after a selected number of data sequences are generated. In some embodiments, LFSR 311 may be constructed such that the selected number may be at least equal to K, where K=2$^J$−1, and where J is the number of bits of the initial seed data such as SEED$_0$[0] to SEED$_0$[11]. In some embodiments, the selected number is a variable, which may be set to a different value at a different time. In some embodiments, the variable is programmable and may be provided to generator as the data represented by CNTL in FIG. 3.

In some embodiments, data generator 300 of FIG. 3 may begin to generate the data sequences in the reverse order after at least one of the previously generated data sequences repeats. In other embodiments, data generator 300 may begin to generate the data sequences in a reverse order after at least R times (2$^J$−1) possible combinations of bit $D_0$ to $D_Z$ are generated, where R is equal to or greater than one, and where J is equal to the number of bits represented by $D_0$ to $D_M$.

FIG. 4 shows an example of a bit such as bit SEED$_X$[11] being shifted from the LFSR box (LFSR 311 in FIG. 3) to the shift register box (shift register 313 in FIG. 3) between time T0 and time T16. In some embodiments, any bit from the LFSR 311 FIG. 3 may be shifted to shift register 313 between time T0 and time T16. For example, bit SEED$_X$[6] instead of bit SEED$_X$[11] may be shifted from LFSR 311 to shift register 313 between time T0 and time T16. If a bit such as bit SEED$_X$[6] from LFSR 311 is shifted to shift register 313 between time T0 and time T16 in the forward order, the bit at the same position from recovery LFSR 322 in FIG. 3 (bit SEED$_X$[6] in LFSR 322) is shifted back to shift register 313 in the reversed order.

FIG. 4 shows two pseudo-random data patterns 401 and 402 including 33 data sequences from T0 to T32 as an example. In some embodiments, numerous data sequences different from 33 may be generated.

Figure 5:
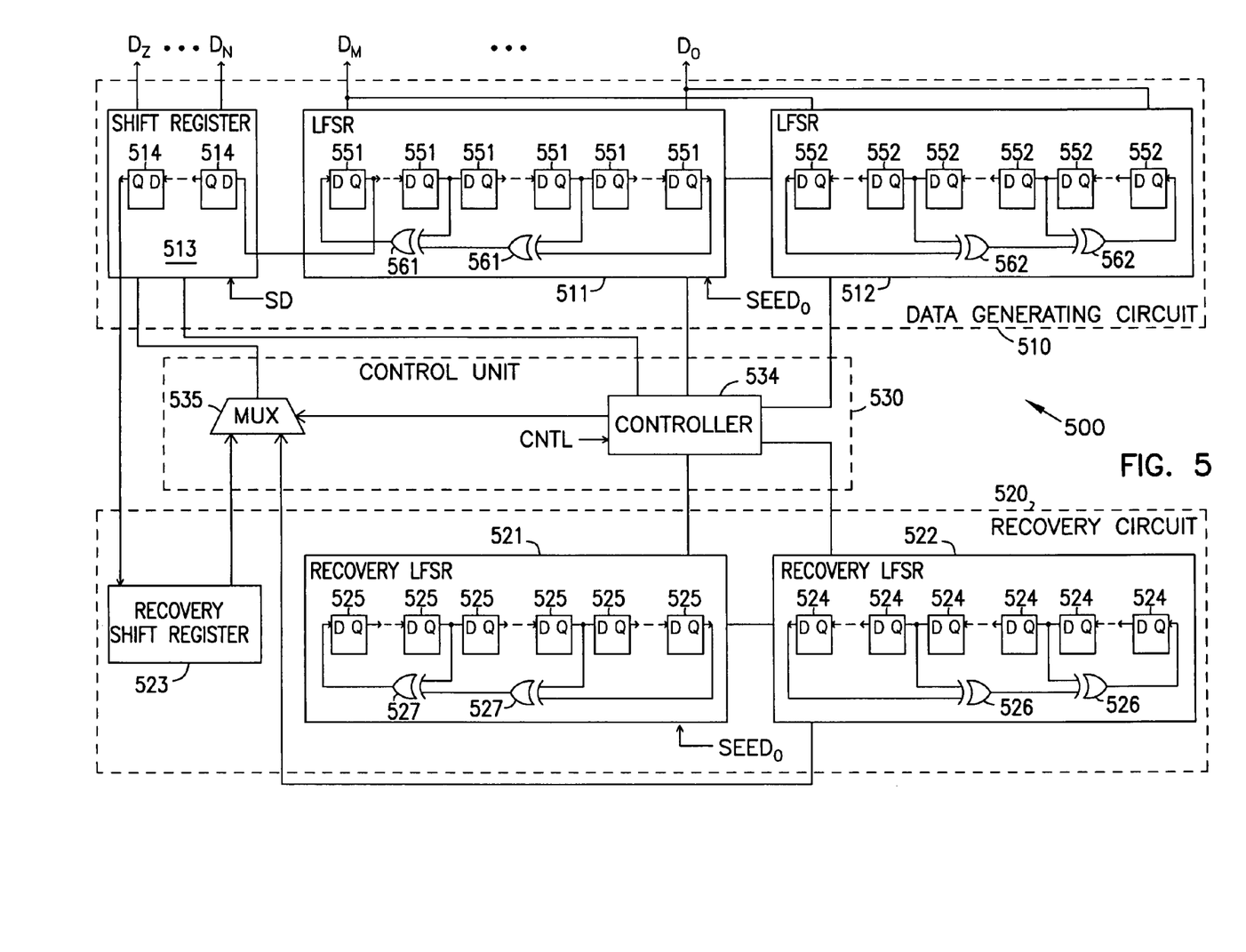
FIG. 5 shows a data generator with LFSRs having register cells and logic gates according to an embodiment of the invention.

FIG. 5 shows a data generator with LFSRs having register cells and logic gates according to an embodiment of the invention. Data generator 500 includes a data generating circuit 510 to generate output data $D_0$ to $D_Z$, a recovery circuit 520 to allow data generating circuit 510 to generate output in a reverse order, and a control unit 530 to control the operation of data generator 500.

Data generating circuit 510 includes an LFSR 511 and an LFSR 512 for generating bits $D_0$ to $D_M$, and a shift register 513 for generating bits $D_N$ to $D_Z$. The operation of data generating circuit 510 is similar to that of the operation of data generating circuit 310 of FIG. 3. In FIG. 5, data generating circuit 510 may generate a first data pattern having number of data sequences during a first duration and second data pattern having a number of data sequences during a second duration. In some embodiments, the data sequences in the second pattern are generated in an order that is a reverse of the order of the data sequences in the first data pattern.

LFSR 511 includes a number of register cells 551 and a number of logic exclusive OR (XOR) gates 561. LFSR 512 includes a number of register cells 552 and a number of logic exclusive OR (XOR) gates 562. Register cells 551 and 552 are shown as flip flops in FIG. 5. In some embodiments, register cells 551 and 552 may be other memory elements. In LFSR 511, register cells 551 and logic gates 561 are arranged in one configuration. In LFSR 512, register cells 552 and logic gates 562 are arranged in another configuration such that LFSR 511 and LFSR 512 perform functions that are reversed from each other.

Shift register 513 includes a number of register cells 514, which are shown in FIG. 5 as flip flops. In some embodiments, register cells 514 may be other memory elements. As shown in FIG. 5, the output "Q" of one of the register cells 551 of LFSR 511 is coupled to an input D of one of the register cells 514 of shift register 513 to provide a data bit to shift register 513. For example, a data such as SEED$_X$[11] described in FIG. 4 may be provided to shift register 513 during the generation of each of the data sequences generated in the forward order during the first duration. In some embodiments, shift register 513 is a bi-directional shift register. FIG. 5 shows that the output "Q" of the register cells 551 at bit position $D_M$ of LFSR 511 is coupled to an input D of one of the register cells 514 of shift register 513. In some embodiments, the output "Q" of the register cells 551 at another bit position (instead of bit position $D_M$) of LFSR 511 may be coupled to an input D of one of the register cells 514 of shift register 513.

Recovery circuit 520 includes a recovery LFSR 521 and a recovery LFSR 522, and a recovery shift register 523. In some embodiments, recovery LFSR 521, recovery LFSR 522, LFSR 511, and LFSR 512 include an equal number of register cells and an equal number of logic gates.

Recovery LFSR 521 and LFSR 511 are constructed to perform an identical function. As shown in FIG. 5, recovery LFSR 521 includes register cells 525 and logic XOR gates 527 arranged in an arrangement similar to that of LFSR 511. The number of register cells 525 of recovery LFSR 521 is equal to the number of register cells 551 of LFSR 511. The number of logic gates 527 of recovery LFSR 521 is equal to the number of logic gates 561 of LFSR 511. An equal number of register cells and logic gates allow LFSR 511 and recovery LFSR 521 to perform a similar function.

Recovery LFSR 522 and LFSR 512 are constructed to perform an identical function. As shown in FIG. 5, recovery LFSR 522 includes register cells 524 and logic XOR gates 526 arranged in an arrangement similar to that of LFSR 512. The number of register cells 524 of recovery LFSR 522 is equal to the number of register cells 552 of LFSR 512, the number of logic gates 526 of recovery LFSR 522 is equal to the number of logic gates 562 of LFSR 512. An equal number of register cells and logic gates allow LFSR 512 and recovery LFSR 522 to perform a similar function.

The numbers of register cells and logic gates of data generator 500 shown in FIG. 5 are only for examples. In some embodiments, the numbers of register cells and logic gates of data generator 500 may be different from the number shown in FIG. 5.

In some embodiments, at least a portion of data generator 500 may be used in data generator 300 of FIG. 3 to generate a pseudo-random data pattern in both forward and reverse orders such as pseudo-random data patterns 401 and 402 of FIG. 4.

Figure 6:
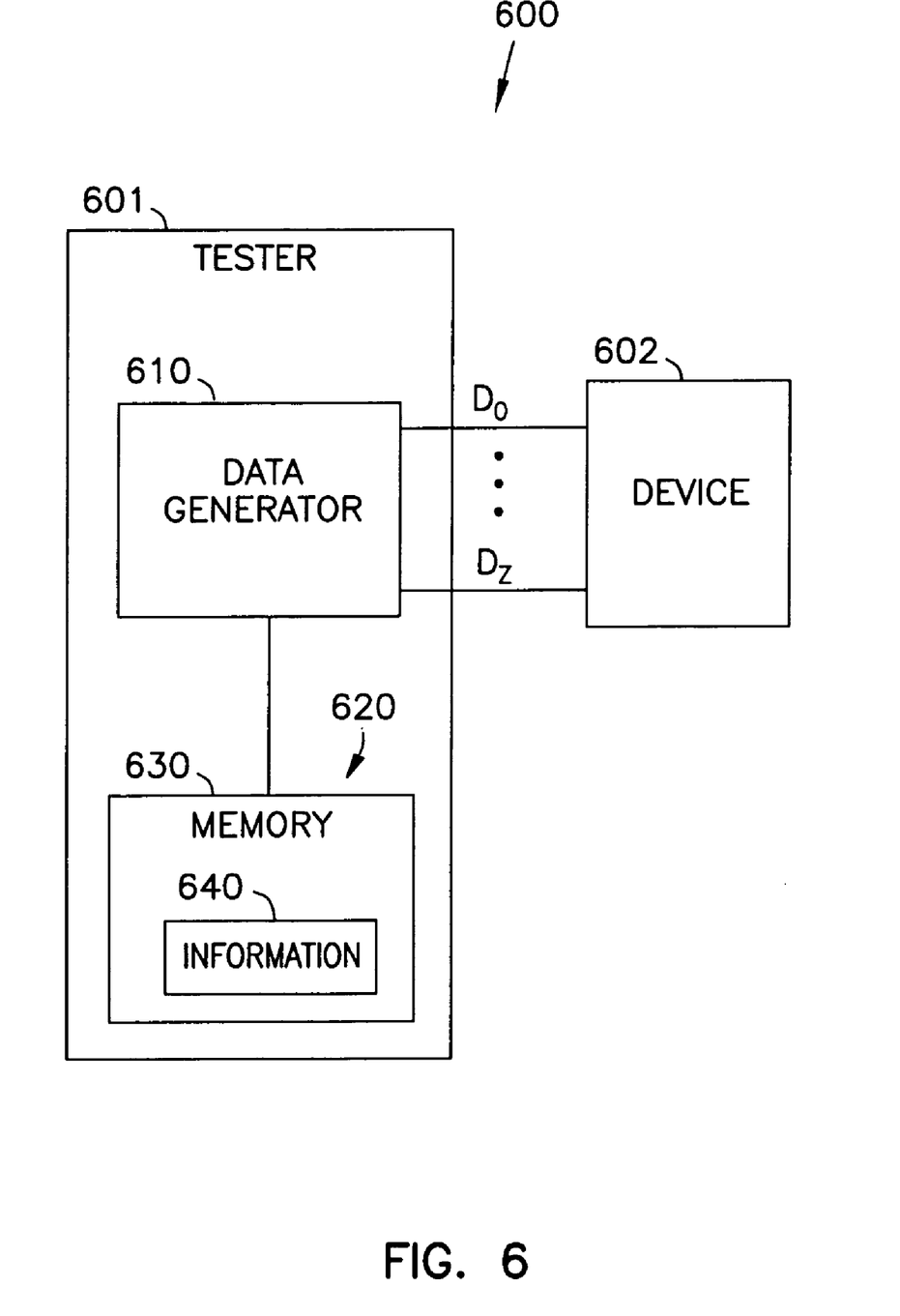
FIG. 6 shows a system according to an embodiment of the invention.

FIG. 6 shows a system according to an embodiment of the invention. System 600 includes a tester 601 and a device 602. Device 602 includes a semiconductor device. Device 602 may be a memory device, a processor, or other integrated circuit devices. An example of a memory device represented by device 602 includes a dynamic random access memory (DRAM) device, a static random access memory (SRAM) device, or a flash memory device.

Tester 601 includes a data generator 610 to generate a pseudo-random data pattern to test device 602. The pseudo-random data pattern may include a number of data sequences in which each of the data sequences is a combination of $D_0$ to $D_Z$. In some embodiments, data generator 610 includes embodiments of data generator 100, 300, or 500 described in FIG. 1 through FIG. 5. Thus, device 602 may be tested with a number of first data sequences that are generated in a forward order and with a number of second data sequences that are generated in a reverse order using the same generator such as generator 610.

In some embodiments, device 602 may be tested by writing the first data sequences, the second data sequences, or a combination of the both first data sequences and the second data sequences to device 602. After the writing, device 602 may also be tested by reading the first data sequences, the second data sequences, or a combination of the both first data sequences and the second data sequences from device 602. The first data sequences or the second data sequences read from device 602 may be compared to the corresponding first data sequences or the second data sequences previously written to device 602. The result of the comparison may indicate the result of the test of device 602. In some embodiments, writing and reading may involve writing and reading to and from dynamic, static, or flash memory cells of device 602.

Tester 601 also includes article 620. Article 620 includes a machine-accessible medium such as a memory portion 630. Memory portion 630 may be removable storage media. Memory portion 630 may include any type of memory such as electrical, optical, or electromagnetic. Memory portion 630 has associated data or information 640. Examples of associated information 640 are computer program instructions.

Associated information 640, when accessed, results in a machine such as tester 601 performing activities such as generating a first pseudo-random data pattern having a number of first data sequences, generating a second pseudo-random data pattern having a number of second data sequences, in which the second data sequences are generated in a reversed order the first data sequences. Other activities may include writing at least one of the number of the first data sequences and the number of the second data sequences to a device such as device 602, and reading at least one of the number of the first data sequences and the number of the second data sequences from the device. The activities performed when associated information 640 is accessed may include activities described in FIG. 1 through FIG. 5.

CONCLUSION

Various embodiments of the invention provide circuits and methods for generating a number of first data sequences in a first order, and a number of second data sequences in a second order. The second order is a reverse of the first order such that the first and second data sequences include the same data pattern but are generated in orders that are reversed from each other. The first order may be referred to as a forward order of the data pattern. The second order may be referred to as the reversed order of the data pattern. Generating the data pattern in both forward and reverse orders, as described herein, may expand the use of the data pattern. In some embodiments, testing of devices such as memory devices may be improved when the data pattern generated according to the embodiments described herein is used.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A data generator comprising:
a data generating circuit for generating a plurality of first data sequences during a first duration, wherein the first data sequences are generated in a first order; and
a recovery circuit for allowing the data generating circuit to generate a plurality of second data sequences during a second duration, wherein the second data sequences are generated in a second order, wherein the second order is a reverse of the first order, wherein the recovery circuit includes a first recovery linear feedback shift register for generating a plurality of recovery data bits to retain a copy of a content of the first linear feedback shift register during the first duration, and wherein the data generating circuit includes:
a first linear feedback shift register for generating a first portion of each of the first data sequences;
a second linear feedback shift register for generating a first portion of each of the second data sequences; and
a shift register for generating a second portion of each of the first data sequences and for generating a second portion of each of the second data sequences.

2. The data generator of claim 1, wherein the recovery circuit includes a second recovery linear feedback shift register for generating the plurality of recovery data bits in an order reversed from an order that the plurality of recovery data bits are generated by the first recovery linear feedback shift register.

3. The data generator of claim 2, wherein the recovery circuit includes a recovery shift register for retaining a copy of an initial content of the shift register of the data generating circuit.

4. The data generator of claim 2, wherein the first recovery linear feedback shift register and the first linear feedback shift register of the data generating circuit are constructed to perform an identical function.

5. The data generator of claim 2, wherein the second recovery linear feedback shift register and the second linear feedback shift register of the data generating circuit are constructed to perform an identical function.

6. A data generator comprising:
- a plurality of output nodes for providing a plurality of first data sequences during a first duration and for providing a plurality of second data sequences during a second duration;
- a plurality of linear feedback shift registers for generating a first group of data bits of each of the first data sequences during the first duration, and for generating a first group of data bits of each of the second data sequences during the first duration;
- a shift register coupled in series with the linear feedback shift registers for generating a second group of data bits of each of the first data sequences, and for generating a second group of data bits of each of the second data sequences; and
- a recovery circuit for allowing the linear feedback shift registers and the shift register to generate the first data sequences in a first order and the second data sequences in a second order, wherein the second order is a reverse of the first order.

7. The data generator of claim 6, wherein the plurality of linear feedback shift registers includes:
- a first linear feedback shift register for generating the first group of data bits in each of the first data sequences based on a plurality of seed data bits provided to the first linear feedback shift register at a beginning of the first duration; and
- a second linear feedback shift register for generating a first group of data bits in each of the second data sequences based on the first group of data bits in the first linear feedback shift register at an end of the first duration.

8. The data generator of claim 7, wherein the first linear feedback shift register and the second linear feedback shift register include an equal number of register cells.

9. The data generator of claim 8, wherein the first linear feedback shift register and the second linear feedback shift register include an equal number of logic gates.

10. The data generator of claim 6, wherein the shift register is a bi-directional shift register.

11. The data generator of claim 6, wherein the recovery circuit includes:
- a first recovery linear feedback shift register;
- a second recovery linear feedback shift register coupled to the first linear feedback shift register; and
- a recovery shift register for retaining a copy of an initial content of the shift register of the data generating circuit at a beginning of the first duration.

12. The data generator of claim 11, wherein the first recovery linear feedback shift register and the second recovery linear feedback shift register include an equal number of register cells.

13. The data generator of claim 12, wherein the first recovery linear feedback shift register and the second recovery linear feedback shift register include an equal number of logic gates.

14. The data generator of claim 11 further comprising a MUX for providing the shift register data selected from one of the recovery shift register and the second recovery linear feedback shift register during the second duration.

15. A system comprising:
- a memory device; and
- a tester for generating a plurality of first data sequences and plurality of second data sequences to test the memory device, the tester including a data generating circuit for generating the first data sequences in a first order, and a recovery circuit for allowing the data generating circuit to generate the second data sequences in a second order, and wherein the second order is a reverse of the first order, wherein the data generating circuit includes:
  - a first linear feedback shift register for generating a number of data bits to represent a first portion of each of the first data sequences;
  - a second linear feedback shift register for generating a number of data bits to represent a first portion of each of the second data sequences; and
  - a shift register for generating a number of data bits to represent a second portion of each of the first data sequences and for generating a number of data bits to represent a second portion of each of the second data sequences.

16. The system of claim 15, wherein the recovery circuit includes:
- a first recovery linear feedback shift register;
- a second recovery linear feedback shift register coupled to the first recovery linear feedback shift register; and
- a recovery shift register coupled to the shift register of the data generating circuit.

17. The system of claim 16, wherein a circuit structure of the first recovery linear feedback shift register is a copy of a circuit structure of the first linear feedback shift register of the data generating circuit.

18. The system of claim 17, wherein a circuit structure of the second recovery linear feedback shift register is a copy of a circuit structure of the second linear feedback shift register of the data generating circuit.

19. The system of claim 18 further comprising a multiplexer having inputs coupled to the recovery shift register and the second recovery linear feedback shift register, and an output coupled to the shift register of the data generating circuit.

20. A method comprising:
- generating a first pseudo-random data pattern having a number of first data sequences, wherein generating the first pseudo-random data pattern includes generating each of the first data sequences at a different time during a first duration, wherein generating each of the first data sequences includes generating a first portion of each of the first data sequences using a first linear feedback shift register, and generating a second portion of each of the first data sequences using a shift register;
- generating a second pseudo-random data pattern having a number of second data sequences, wherein the second data sequences are generated in a reversed order of the first data sequences, wherein generating the second pseudo-random data pattern includes generating each of the second data sequences at a different time during a second duration, wherein generating each of the second data sequences includes generating a first portion of each of the second data sequences using a second linear feedback shift register, and generating a second portion of each of the second data sequences using the shift register; and
- generating a plurality of recovery data bits to retain a copy of a content of the first linear feedback shift register during the first duration.

21. The method of claim 20 further comprising:
- selecting a value for the number of the first data sequences before the number of the first data sequences are generated.

22. The method of claim 20, wherein the first data sequences include at least one pattern of data sequences and at least a portion of the pattern of the data sequences.

23. The method of claim 20 further comprising:
writing at least one of the number of the first data sequences and the number of the second data sequences to a device; and
reading at least one of the number of the first data sequences and the number of the second data sequences from the device.

24. The method of claim 23, wherein writing includes writing to memory cells of the device.

25. A method comprising:
providing a number of initial seed data bits to a first linear feedback shift register;
providing a number of initial shift data bits to a shift register, wherein the initial seed data bits and the initial shift data bits form an initial data sequence,
generating a selected number of first data sequences based on the initial data sequence, wherein the selected number is at least equal to K, wherein $K=2^J-1$, wherein J is the number of the initial seed data bits, and wherein the initial data sequence is one of the $K=2^J-1$ first data sequences; and
generating a number of second data sequences, wherein the first data sequences are generated in a first order, wherein the second data sequences are generated in a second order, and wherein the second order is a reverse of the first order.

26. The method of claim 25, wherein the first order is a pseudo-random of the first data sequences.

27. The method of claim 25, wherein generating the selected number of first data sequences includes selecting a value for the selected number.

28. The method of claim 25, wherein the second data sequences are generated before one of the first data sequences repeats.

29. The method of claim 25, wherein the second data sequences are generated after at least one of the first data sequences repeats.

30. The method of claim 25, wherein generating the selected number of first data sequences includes:
generating a first portion of each of the first data sequences based on data in the linear feedback shift register; and
generating a second portion of each of the first data sequences using the shift register, wherein at least one data bit of the second portion of at least one of the first data sequences is provided by the linear feedback shift register.

31. The method of claim 25, wherein generating the second data sequences includes:
generating at a first recovery linear feedback shift register a number of seed data bits based on the initial seed data bits;
generating at a second recovery linear feedback shift register a number of recovery seed data bits based on the seed data bits from the first recovery linear feedback shift register;
copying an initial content of the shift register to a recovery shift register;
generating at a second linear feedback shift register a first portion of each of the second data sequences based on data from the first linear feedback shift register; and
generating a second portion of each of the second data sequences using the shift register, wherein at least one data bit of the second portion of each of the second data sequences is provided by one of the first recovery linear feedback shift register and the recovery shift register.

32. The method of claim 25 further comprising:
writing at least one of the selected number of the first data sequences and the number of the second data sequences to a memory device; and
reading at least one of the selected number of the first data sequences and the number of the second data sequences from the memory device.

* * * * *

UNITED STATES PATENT AND TRADEMARK OFFICE
CERTIFICATE OF CORRECTION

PATENT NO. : 7,668,893 B2 Page 1 of 1
APPLICATION NO. : 11/215890
DATED : February 23, 2010
INVENTOR(S) : Bryan A. Stern It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1187 days.

Signed and Sealed this

Seventh Day of December, 2010

David J. Kappos
*Director of the United States Patent and Trademark Office*